United States Patent [19]
Folgerö et al.

[11] 3,851,090
[45] Nov. 26, 1974

[54] MEANS FOR MELTING, HOLDING AND TAPPING METALS OR METAL ALLOYS

[75] Inventors: Kåre Folgerö; Bengt Fredrickson, both of Vasteras, Sweden

[73] Assignee: Allmanna Svenska Elektriska Aktiebolaget, Vasteras, Sweden

[22] Filed: Mar. 19, 1973

[21] Appl. No.: 342,368

[30] Foreign Application Priority Data
Mar. 29, 1972 Sweden.............................. 4050/72

[52] U.S. Cl........................................ 13/26, 13/29
[51] Int. Cl........................... H05b 5/00, F27d 3/14
[58] Field of Search.................................. 13/29, 26

[56] References Cited
UNITED STATES PATENTS
2,936,326   5/1960   Tama................................ 13/29 X Primary Examiner—R. N. Envall
Attorney, Agent, or Firm—Kenyon & Kenyon, Reilly, Carr & Chapin

[57] ABSTRACT

Apparatus for melting, holding and tapping metals or metal alloys, in which solid material is melted down in a channel-type induction furnace, the melt then being transferred to a second channel-type induction furnace to be kept hot, possibly over-heated and stored, characterized in that the melting furnace is connected to the second furnace by way of a feeding channel and is located at a higher level than the second furnace and that the second furnace is in the form of a pressure furnace for pressure tapping through a spout.

7 Claims, 7 Drawing Figures

MEANS FOR MELTING, HOLDING AND TAPPING METALS OR METAL ALLOYS

BACKGROUND OF THE INVENTION

The present invention relates to a means for melting, holding and tapping metals or metal alloys, in which solid material is melted down in a channel-type induction furnace, the melt then being transferred to a second channel-type induction furnace to be kept hot, possibly over-heated, and stored.

One such known arrangement is not particularly suitable for melting down chips and such like of light and heavy metals since the smoke emission and also the occurrence of metal oxides is troublesome and complicates work near the furnace. Furthermore, the surroundings become spoiled and pollution problems may arise, particularly when brass chippings are being melted. It is also difficult to control the tapping and achieve efficient stirring of the charge into the melt. With this known arrangement, the intention was to use the pinch effect in the channel for the tapping.

In order to avoid these environmental and operational problems when dealing with chips of iron and steel as well as non-ferrous metals such as brass or aluminium, crucible type induction furnaces have been used, usually low frequency, so that the repulsion stirring effected by the induction coil is utilized to immerse solid charge material in the melt quickly before any noticeable smoke emission has occurred, or in the case of brass, before any zinc has had time to be liberated. One drawback with such crucible furnaces is their relatively high price and high running costs (electric power and lining costs compared to those of the crucible furnace).

SUMMARY OF THE INVENTION

The invention aims at a channel-type induction furnace construction which avoids said environmental and personnel problems and metal burning off. The invention uses a melting furnace in the form of a channel-type induction furnace which is connected by a feeding channel to a second channel-type induction furnace and is located at a level higher than the second furnace, and the second furnace is in the form of a pressure furnace, inter alia for pressure tapping through a spout. Thus, only channel-type induction furnaces are used, which makes for a considerably cheaper construction than crucible type induction furnaces while at the same time offering easily controlled charging of the second channel-type induction furnace, without detriment to the surroundings and without the need for stirring or feeding members for this. Feeding the second furnace can be completely controlled by the pressure and the whole plant can be in the form of a closed unit. For reasons which will be explained in more detail later on, solid charge will be quickly immersed below the surface of the melt in the melting furnace and the charge in the same furnace will be quickly homogenized. One advantage with the immersion is that metal burning off caused by oxidation is reduced.

In a preferred embodiment a tapping spout is arranged connected to the feeding channel so that tapping may take place due to pressure in the second furnace.

THE DRAWINGS

The invention is further exemplified in the accompanying drawings in which

PREFERRED EMBODIMENT

In a channel-type induction furnace, for example the melting furnace 11 (FIG. 4), circulatory movements are obtained in the melt in front of the channel orifices according to the Figure, because of the pinch effect in the inductor of the furnace. Thus, above the uppermost orifice of each a so-called meniscus 12 is obtained, i.e., an elevation of the melt in which circulatory movements occur as indicated by the arrows A. Such a meniscus 12 has the advantage that when solid charge, such as chips or brass, aluminum or steel, reaches the surface, this material is quickly drawn down below the surface and melts. This effect is increased the greater the volume of the meniscus is and this volume increases with the power up to the limit where the pinch effect cuts off the melt in the channel.

Figure 1:
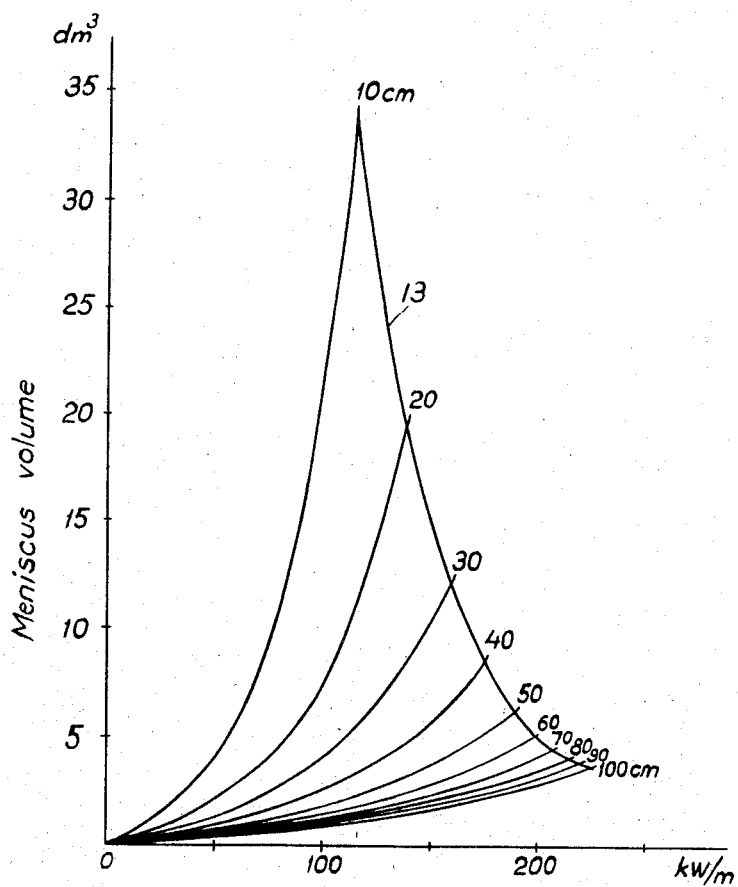
FIG. 1 shows a curve indicating the shape of the melt surface and the meniscus volume at different depths of the bath and different power and FIG. 2 shows curves indicating the degree of efficiency and meniscus volume at different levels of the melt in the hearth of a channel-type induction furnace.

FIG. 1 shows a nomogram indicating the conditions in an aluminium furnace with the power supplied in each channel ($kW/m$) on the x-axis and the meniscus volume on the y-axis ($dm^3$). The other curves in the group refer to different depths of the bath above the highest channel orifice, for example in the channel-type induction furnace 11 according to FIG. 4. The effect limit for each bath depth is defined by the limit line 13 (pinch effect limit). It is seen from this monogram that the volume of the meniscus increases with increased power but decreases with increased bath depth and that one should not aim only at maximal meniscus volume since the greatest power which can be applied at this bath depth is relatively little whereas, as can be seen from FIG. 1, it increases with increasing bath depth. In other words, the degree of efficiency ($\eta$) of the inductor increases as the bath depth decreases.

Figure 2:
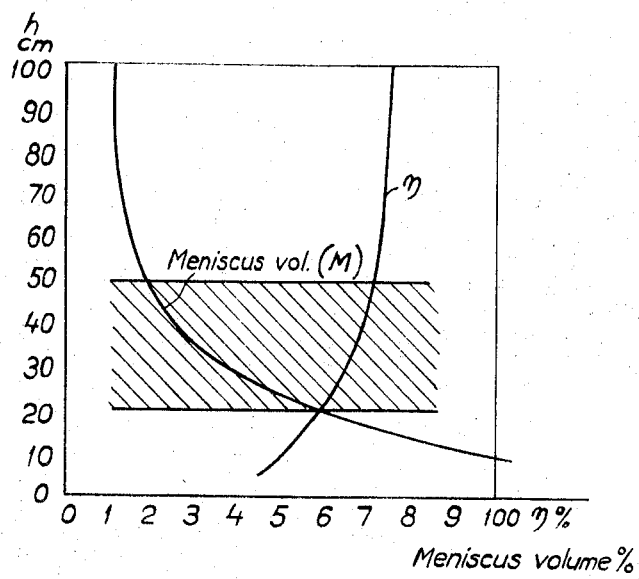

FIG. 2 shows the alteration in efficiency ($\eta$) for different volumes of the meniscus and it can be seen that at least with small meniscus volumes, the efficiency is increased. The ratio between maximal meniscus volume and bath depth can be seen from FIG. 2 where it can also be seen that the meniscus volume increases as the bath depth decreases and vice versa. An optimum is reached in the vicinity of the intersection between these curves and this intersection lies within the shaded area, i.e., the useful bath depth. $\eta$ is obtained in accordance with the formula $P = P_f + P_{SM}$, where P is the total power, $P_f$ the loss ($\approx$ constant) and $P_{SM}$ the melt effect. $\eta = P_{SM}/P$. Thus, a relatively low level should be maintained in the melt in the melting furnace 11 in order to acquire satisfactory meniscus volume (efficient and rapid homogenization of the melt) and a reasonable degree of efficiency.

Figure 3:
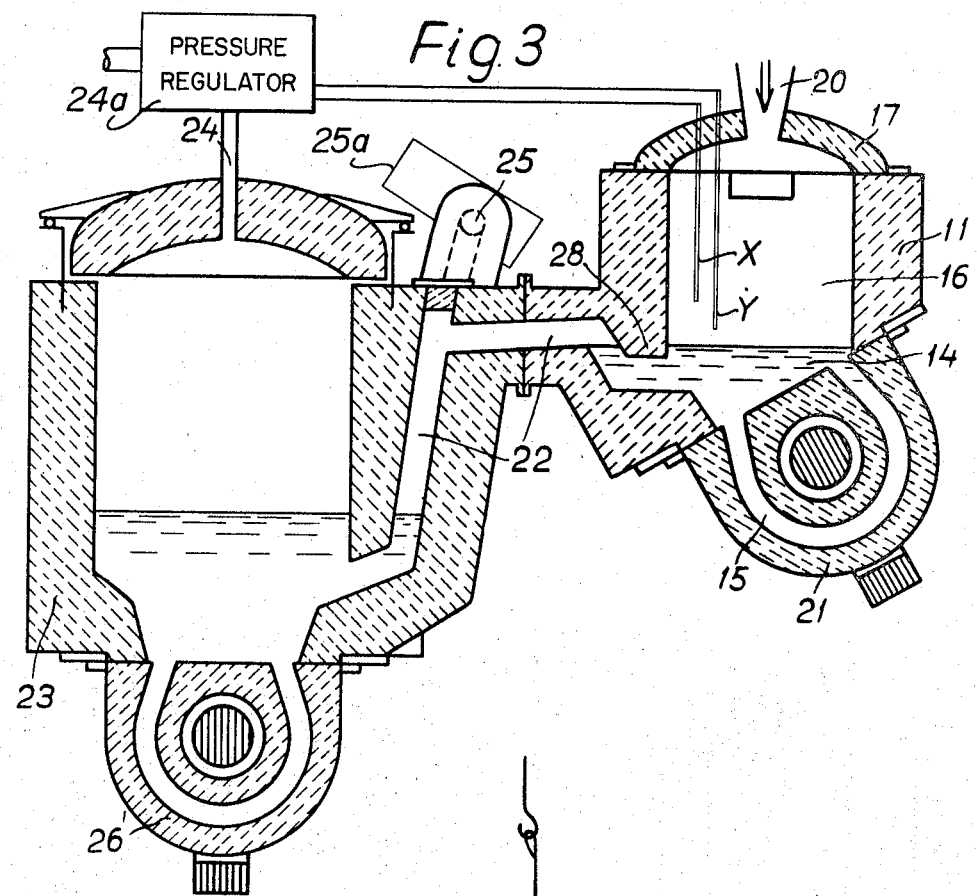
FIG. 3 shows a channel-type induction furnace arrangement having two connected furnaces, only the sumps being filled with melt.
Figure 3A:
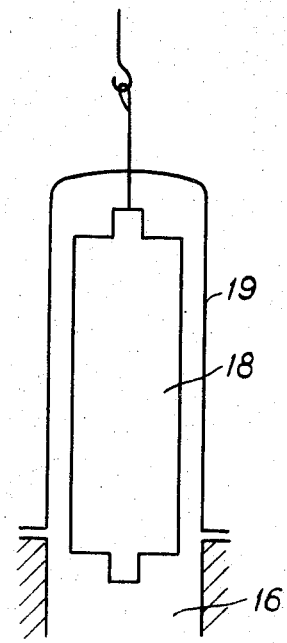
FIG. 3a shows a solid-material charging arrangement.

The arrangement according to the invention is shown in the accompanying FIGS. 3 – 6. FIG. 3 shows the melting furnace 11 with melt sump 14 in channel 15 of an inductor, and the lower part of the hearth 16. As shown by the drawings, this furnace 11 can be made small in size and therefore economical as to cost and maintenance. The furnace is provided with a cover 17 or a lid in which a charging member 20 is arranged for solid material such as brass or aluminium chips. Other types of solid charge may also be used, including ferrometals. The lower part of FIG. 3 shows a cover 19 with a used roller 18 or an ingot which is to be melted by gradual immersion in the bath in the furnace 11. The cover 17 (19) prevents smoke and gases from escaping to the surroundings. Another application for the invention is in combination with furnaces for the continuous production of raw iron (WORCRA) where viscous raw iron is to be collected and overheated for metallurgical treatment and then cast in chills or in continuous casting machines. The inductor 21, here a single channel inductor, but which may be a twin-coil inductor, single or multi-phase fed, is arranged with a channel orifice at a higher level than the other orifice(s), in this case the one furthest away from the feeding (connection) channel to a second channel-type induction furnace, with the intention of obtaining a larger and higher meniscus over this higher orifice.

A second and substantially larger channel-type induction furnace 23 (holding furnace) is connected to this channel-type induction furnace 11 by way of a feeding channel 22, the second furnace being located at a lower level than the furnace 11. The second furnace is provided with a supply conduit 24 for pressure medium, for example inert gas such as argon, or even an active gas such as air. The furnace 23 is in the form of a pressure tapping furnace of conventional design which is closed at the top except for the supply means for the pressure medium. This means that no smoke or gas from the melting and heat-retaining process escapes to the surroundings. Connected to the feeding channel 22 is a spout 25 through which the melt can be tapped under pressure in the second channel-type induction furnace 23 at the same time as the melt continues to be melted in the first furnace 11, at least to a certain extent. The spout 25, or its connecting conduit 26 (FIG. 6) at the side of the feeding channel 22, is closable, the spout 25 being shown in FIG. 3 with a closure 25a which can be opened when the melt is to be tapped, so that when closed, by varying the pressure in the second furnace it is possible to vary the level of the melt, or keep it constant, and set a suitable bath depth in the melting furnace 11.

The inductor 26 of the second channel-type induction furnace 23 (there may even be more) and the inductor 21 of the furnace 11 may either or both be of single or multi-channel type, as mentioned above.

The inlet 24 is arranged to be controlled by a melt level gauge in the melting furnace 11. The gauge disclosed by the Thalmann et al U.S. Pat. No. 3,537,505 may be used to control any of the prior art pressure adjustors for the inlet 24. However, for schematic illustration, a gauge is shown in FIG. 3 as comprising electrical contact rods X and Y depending in the hearth 16 of the furnace to different extents, and connected to control a pressure regulator 24a for the inlet 24. When neither rod is contacted by the melt, the pressure in the furnace 23 is increased until the melt contacts the rod Y, and if the melt contacts the rod X, the pressure is decreased, all as required to maintain the melt level in the hearth 16 of the furnace 11 about at the level providing a satisfactory melt meniscus and a reasonable degree of efficiency, as explained hereinbefore. For the hereinafter described deslaging of the hearth 16 of the furnace 11, the regulator 24 should also be manually controllable.

Figure 4:
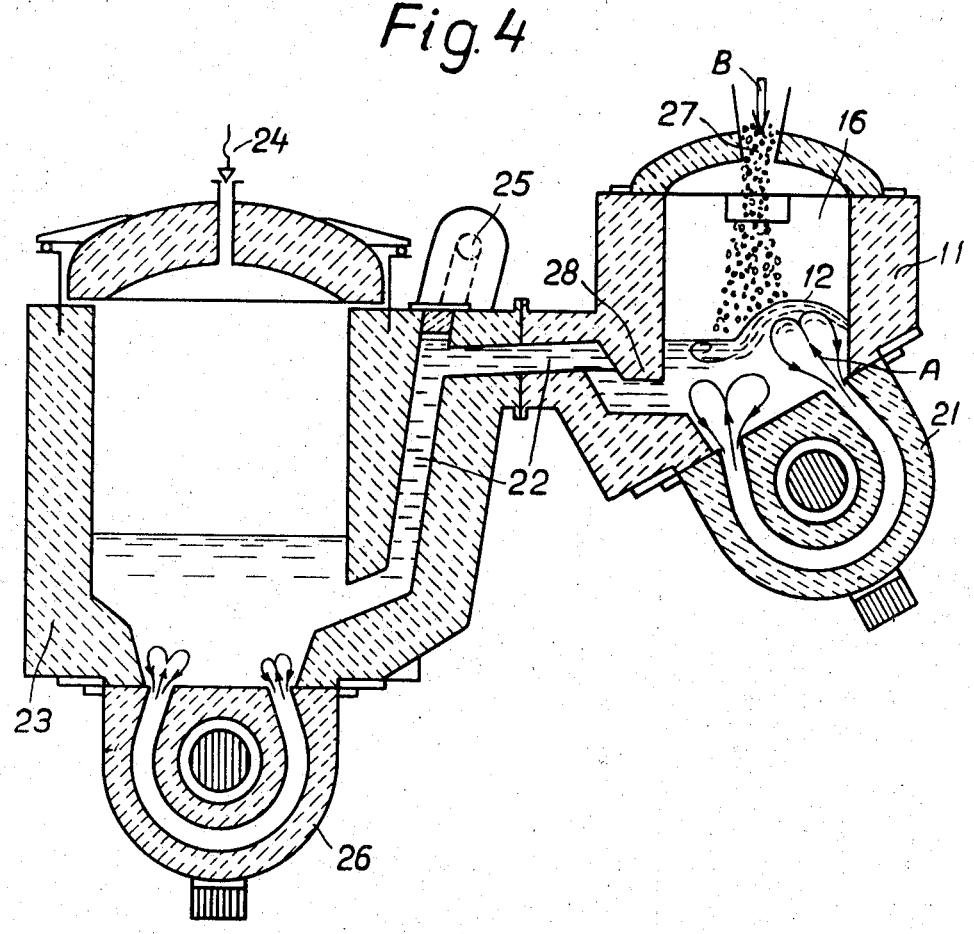
FIG. 4 shows the same arrangement already filled with charge and during charging and melting.

FIG. 4 shows how solid material 27, in this case chips, pellets or chunks of material, such as chips of brass or aluminium (or steel or iron) is fed into the furnace 11 in the direction of the arrow B. When power is supplied to the inductor 21 a flow shape is obtained at the channel orifices as indicated by the arrows A and a meniscus is formed above each channel orifice, the largest and most dominant at the highest channel orifice (see at 12). The charge material is thus rapidly drawn down into the melt in the furnace hearth 16 and the material in this is quickly homogenized. The melt is blocked laterally by a slag screen 28 which prevents slag from penetrating into the feeding channel 22. The stirring from the channels of the inductor 21 will not affect the flow of melt between the furnaces 11 and 23, this flow being determined by the level difference, pressure difference and how much material is in the furnaces.

The second furnace 23 is used to store the melt as well as for heat-retention and possibly for overheating the melt. Due to the action of the inductor 26 the melt in the furnace 23 is stirred and homogenized to the extent desired with respect to temperature gradients and alloying components.

The pressure medium (via 24) is supplied to such an extent that the desired melt level and meniscus volume is maintained in the melting furnace 11 (the spout 25 may be closed) and can be regulated automatically by maintaining a certain amount of pressure in the furnace with the help of the level gauge in the furnace hearth 16. Since the furnaces operate as a closed system pollution of the surroundings is avoided and the meniscus 12 causes the charge to be rapidly mixed with the melt in the furnace 11. Here is therefore an excellent chance of making use of channel-type induction furnaces for dealing with charges of non-ferrous type also, in a way which is not detrimental to the environment.

Figure 5:
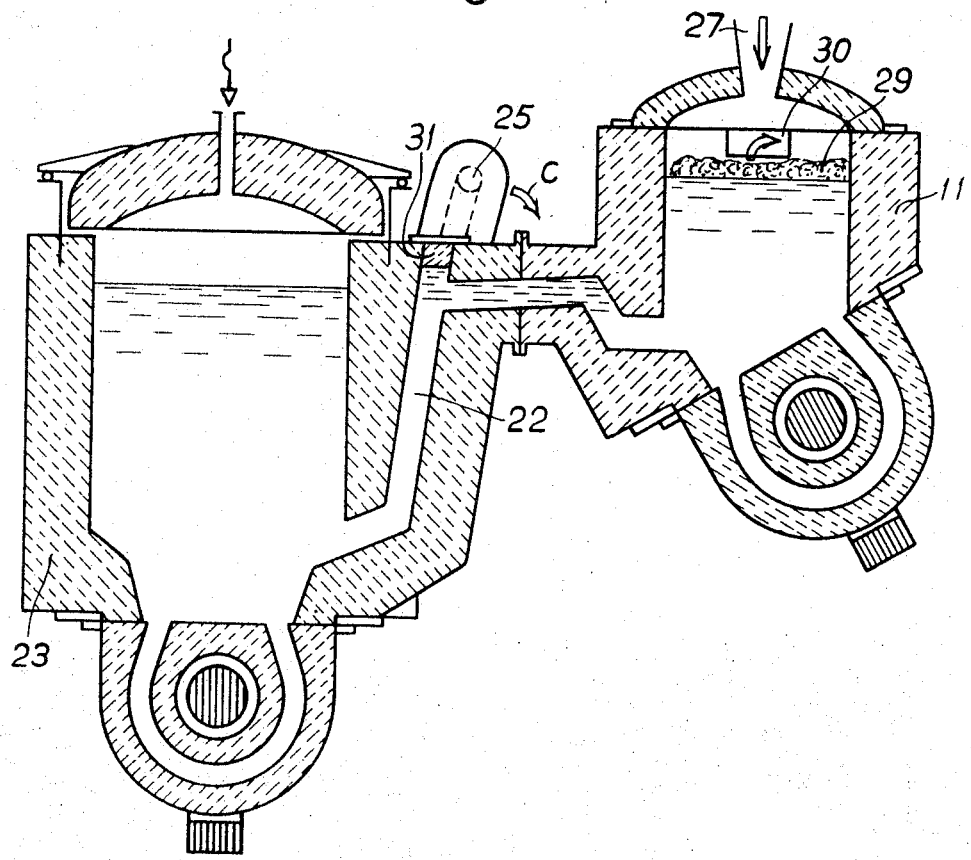
FIG. 5 shows the holding furnace unit being tapped and the melting furnace unit being de-slagged and FIG. 6 shows the same arrangement seen from above.
Figure 6:
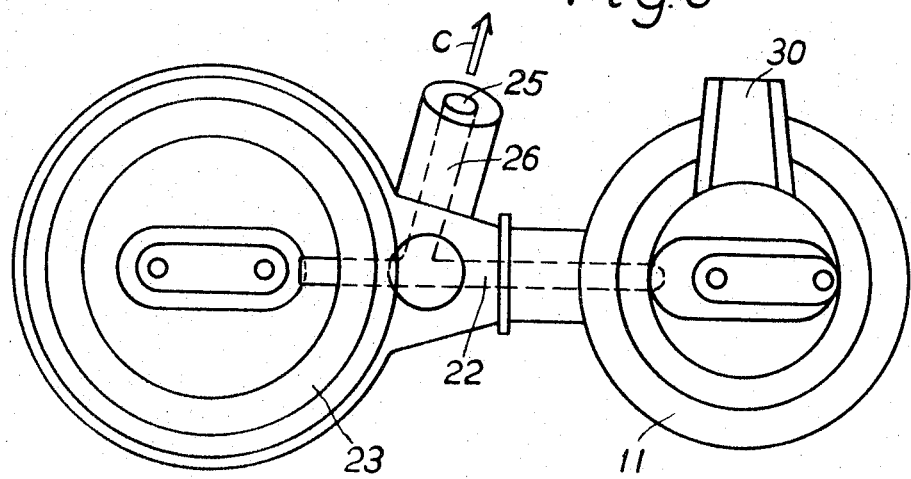

FIG. 5 shows how an arrangement according to the invention is tapped. The spout 25 is opened, charging at 27 is discontinued or reduced and the pressure over the bath surface in the furnace 23 is increased so that melt is tapped at the arrow C (see also FIG. 6). As shown by FIG. 5, the tapping spout 25 opens at a level below that to which the melt in the furnace 11 rises during this tapping. 31 is a cleaning plug for the feeding channel 22, which can be removed when cleaning is necessary. If the spout 25 is closed and the pressure in the furnace 23 increased, the slag 29 on the surface of the melt in the furnace 11 can be forced up to the level of a cleaning hatch or opening 30 to be removed there through or in some other way. The plant is particularly advantageous when processing chips or other charge forms of brass, aluminium or its alloys, magnesium or its alloys and, as mentioned, even ingots or other solid pieces, worn rollers, etc. can be melted down in a manner not detrimental to the environment.

The means described above can be varied in many ways within the scope of the following claims.

What we claim is:

1. Apparatus for forming metallic charging material into a melt and holding and tapping said melt, and comprising a first channel-type induction furnace having a melting hearth in which said melt is formed, a second channel-type induction furnace having a holding hearth in which said melt is held, a melt-feeding conduit connecting said melting hearth to said holding hearth and means for applying gas pressure on said melt in said holding hearth; wherein the improvement comprises said first furnace being small as compared to said second furnace and said second furnace being positioned at a lower level than said first furnace.

2. The apparatus of claim 1 in which said first furnace has a channel-type-inductor forming channel orifices opening into said melting hearth and having one orifice substantially higher than the other orifice, said conduit having an inlet opening from said melting hearth closer to said other orifice than to said higher orifice.

3. The apparatus of claim 2 in which said gas pressure applying means is controllable to control the melt level in said first furnace's melting hearth.

4. The apparatus of claim 3 in which said conduit has a tapping opening positioned at a level higher than the upper melt level of said second furnace's said holding hearth and lower than the upper melt level of said first furnace's said melting hearth.

5. The apparatus of claim 4 in which said first furnace has a cover substantially preventing escape of fumes from said melting hearth.

6. The apparatus of claim 5 in which said cover has an opening for large solid charging metal objects, and an enclosure for such objects during their charging and which substantially prevents said escape of fumes.

7. The apparatus of claim 4 in which said melting hearth has a slag-discharge opening at a level above its said upper melt level and said tapping opening is closable.

* * * * *